Aug. 11, 1925.                                    1,549,664
                P. MacGAHAN
       METHOD AND MEANS FOR MEASURING FREQUENCY
                 Filed Nov. 16, 1918

WITNESSES:                              INVENTOR
H. T. Shelhamer                       Paul MacGahan
J. H. Procter                               BY
                                       Wesley G. Carr
                                          ATTORNEY Patented Aug. 11, 1925.

1,549,664

UNITED STATES PATENT OFFICE.

PAUL MacGAHAN, OF PITTSBURGH, PENNSYLVANIA, ASSIGNOR TO WESTINGHOUSE ELECTRIC & MANUFACTURING COMPANY, A CORPORATION OF PENNSYLVANIA.

METHOD AND MEANS FOR MEASURING FREQUENCY.

Application filed November 16, 1918. Serial No. 262,798.

*To all whom it may concern:*

Be it known that I, PAUL MACGAHAN, a citizen of the United States, and a resident of Pittsburgh, in the county of Allegheny and State of Pennsylvania, have invented a new and useful Improvement in Methods and Means for Measuring Frequency, of which the following is a specification.

My invention relates to electrical measuring instruments and particularly to methods and means for indicating frequency.

The object of my invention is to provide a direct-reading frequency meter that shall have a relatively high torque, be simple and inexpensvie to construct and accurate in its indications.

In practicing my invention, I provide a magnetizable core member having a tapered pole piece. A metallic closed-circuit movable bobbin is disposed around the pole piece, and series-connected windings are disposed on the bobbin and on the core member. The two windings co-operate with each other to cause the bobbin to develop a forward torque proportional to the square of the current, and the current traversing the winding on the core member co-operates with the closed-circuit bobbin to cause the same to develop an opposing torque proportional to the product of the square of the current, the deflection of the bobbin and the frequency of the current. Since the bobbin is deflected until the forward and opposing torques are equal, the deflection will be proportional to the frequency of the current.

Figure 1:
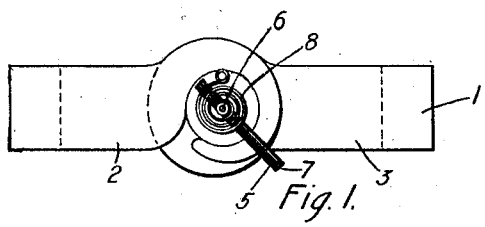
Figure 2:
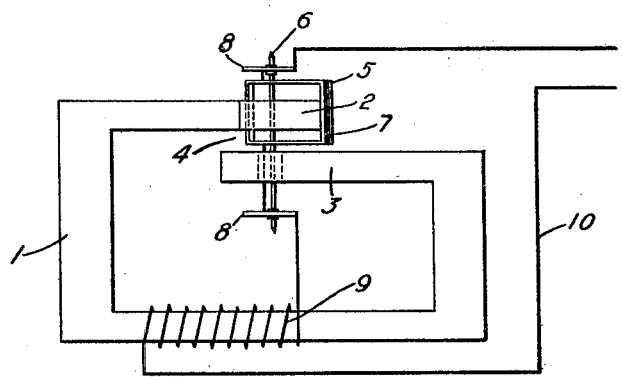

Figure 1 of the accompanying drawings is a top plan view of a measuring instrument embodying my invention, and Fig. 2 is a side elevational view of the instrument shown in Fig. 1.

A magnetizable core member 1 is provided with two pole pieces 2 and 3 that are disposed in substantially parallel relation with respect to each other and separated by an air gap 4. The pole piece 3 is substantially annular in shape and the pole piece 2 is so tapered that the flux intensity therein varies throughout its length. A bobbin 5 that is constructed of metal to constitute a closed-circuit conductor, is mounted on a shaft 6 to surround the pole piece 2 and is provided with a winding 7. Relatively light springs 8 are provided for conducting current to the winding 7 and are adapted to offer substantially no retardation to the movement of the bobbin 5. A winding 9 is disposed on the core member 1 and is connected in series with the winding 7, and the circuit 10, thus constituted, is connected to an electric circuit (not shown) the frequency of the current traversing which is desired to be determined.

With an instrument of this character, there are two forces acting in opposition to cause the deflection of the bobbin 5. One force is caused by the co-operation of the fluxes produced by the currents traversing the windings 7 and 9 and, consequently, is proportional to the square of the current traversing the circuit 10. A retarding or opposing force is also developed in the bobbin 5 by reason of the eddy currents induced in the closed-circuit body when alternating current traverses the windings. This force is proportional to the product of the eddy currents in the bobbin, the flux and the deflection of the bobbin. But the eddy currents are proportional to the product of the flux and the frequency, therefore, the retarding torque is proportional to the product of the square of the current traversing the windings, the deflection and the frequency. Since the forward and opposing torques are equal to each other when the bobbin 5 is balanced or stationary, it will be understood that the deflection of the bobbin is a function of the frequency, and if the pole piece 2 is properly tapered to cause the bobbin 5 to advance into a weaker field as the frequency increases, the deflection of the bobbin 5 will be an indication of the frequency of the current traversing the windings 7 and 9.

The operation just outlined may be mathematically stated as follows: The attraction between the two magnetizing coils 7 and 9 results from the motor reaction of the conductors of the coil 7 lying in the flux in the air gap 4. The torque is $$T_1 \propto V.B,$$

where $V$ is the line voltage or the current, and $B$ is the flux density in the gap. But since $B = V(fD)$, where $(fD)$ is a function of the deflection $D$, we have $$T_1 \propto V^2(fD).$$

The direction of the torque depends, of course, upon the relative directions of the currents in the coils. If the coils 7 and 9 develop magnetomotive forces driving the flux in the same direction in the core 1, it will be seen that the torque $T_1$ will tend to move the coil 7 to the right in the illustrated arrangement.

The repulsion between the stationary coil 9 and the closed-circuited bobbin 5 likewise results from the motor reaction between the current in the bobbin and the flux in the air gap, but since the current is opposite to that in the coil 7, in order to develop an opposing magnetomotive force under Lenz's law, the torque $T_2$ is opposite to the torque $T_1$, and may be written $$T_2 \propto I.B$$

where $I$ is the current in the bobbin. Since $I \propto \sim B_1$, where $\sim$ is the frequency and $B_1$ is the flux density in the bobbin, and since $B = V(fD)$, and $B_1 = V(f_1 D)$, where $(f_1 D)$ is another function of the deflection $D$, we have $$T_2 \propto V^2 \sim (fD)(f_1 D).$$

Putting $T_1 = T_2$, $$V^2(fD) \propto V^2 \sim (fD)(f_1 D),$$

whence $$\tfrac{1}{\sim} \propto (f_1 D)$$

or $$D = (f \sim),$$

where $(f \sim)$ is a function of the frequency.

While it is believed that the mathematical explanation just outlined is correct, applicant does not desire to be altogether limited to any particular theory of operation, so long as the final results pointed out in this specification are substantially obtained.

My invention is not limited to the specific structures illustrated, as it is applicable to various types of structures without departing from the spirit and scope of the invention, as set forth in the appended claims.

I claim as my invention:

1. A frequency meter comprising a magnetizable member embodying a tapered pole piece, a metallic bobbin disposed around the pole piece and movable with respect thereto, a winding on the bobbin and a winding on the magnetizable member.

2. A frequency meter comprising means for producing a graded magnetic field, a metallic bobbin movable within the graded magnetic field and a winding on the bobbin to co-operate with the field-producing means for controlling the movement of the bobbin.

3. A frequency meter comprising a magnetizable core member for producing a graded magnetic field, a winding for energizing the magnetizable member, a coil movable within the magnetic field and a supporting member for the movable coil, the supporting member being influenced by the flux at different portions of the field for controlling the position of the movable coil therein.

4. A frequency meter comprising means for producing a graded magnetic field, a movable metallic bobbin disposed in the magnetic field and a winding disposed on the bobbin for producing a magnetic flux co-operating with the graded magnetic field to move the bobbin to a position in the graded field where eddy currents, produced in the bobbin by the flux of the graded field, co-operate with the said flux of the graded field at that position to balance the torque produced by the combination of the graded magnetic field and the flux created by the movable winding.

5. A frequency meter comprising a magnetizable member embodying a tapered pole piece to produce a graded magnetic field, a winding to energize the magnetizable member, a movable conductive bobbin disposed in the graded field, a winding on the bobbin connected in series with the former winding and creating a magnetic flux that cooperates with the graded field to move the bobbin to a position in the graded field at which eddy currents induced in the bobbin by the flux at that position of the field create a flux that co-operates with the flux at the said position to develop a counter torque that balances the turning torque developed by the two windings.

6. In a frequency meter, the combination with a magnetizable member and a short-circuited bobbin provided with a coil movable with respect to the magnetizable member, of means, comprising an exciting coil for the magnetizable member, connected in series with the movable coil for causing a deflection thereof proportional to the frequency of a circuit.

7. In a frequency meter, the combination with a magnetizable member and a short-circuited bobbin provided with a coil movable with respect to the magnetizable member, of means comprising an exciting coil for the magnetizable member for causing the bobbin to be deflected in accordance with the frequency of an applied circuit.

8. A frequency meter for an electric circuit comprising a movable member, and means for moving the same, comprising current-responsive means for producing magnetic lines of force, means co-operating with said current responsive means for creating a torque in the movable member in one direction in accordance with the current traversing the circuit and other means co-operating with said current-responsive means for creating a counter torque in the opposite direction in accordance with the current and the frequency of the circuit.

9. A frequency meter comprising a movable member and a stationary member separated by an air-gap, means for producing an alternating magnetic flux threading said air-gap, an alternating-current magnetizing winding on said movable member having active conductors responsive to the flux in said air-gap, whereby a controlling torque is produced in one direction, and eddy-current means on said movable member responsive to the frequency as well as the flux therethrough for producing an opposing torque, the arrangement of air-gap being such that said torques are differently affected by the displacement of said movable member.

10. A frequency meter comprising a magnetizable member having ends separated by an air gap, a relatively movable member encircling one of said ends and having a side portion disposed in said air gap, a magnetizing winding on said magnetizable member, a magnetizing winding on said movable member, and an eddy-current means on said movable member, said eddy-current means being so proportioned as to substantially neutralize the effects of current changes in said magnetizing windings.

11. The combination with a variable-frequency alternating-current circuit, of a frequency-responsive mechanism comprising a stationary magnetizable member, a movable member, an alternating-current magnetizing winding disposed on each of said members and energized from said circuit, whereby a motor torque is produced, and means providing a closed-circuit electrical path or paths on one end of said members for providing an opposing torque of such strength as to substantially neutralize the effects of current changes in said magnetizing windings.

12. Apparatus for responding to the frequency of a circuit without materially responding to the magnitude of the current-flow, comprising a relatively stationary magnetic path including a graduated air gap, a magnetizing coil for said path, a movable member including a closed-circuited coil and a magnetizing coil each having conductors located in said air gap, and connecting means adapted to energize said magnetizing coils from said circuit in such manner that the torque therebetween opposes the torque between the stationary coil and the closed-circuited coil, the proportions being such that the effects of variations in current-strength are substantially eliminated.

13. Apparatus for responding to the frequency of a circuit without materially responding to the magnitude of the current-flow, comprising a movable member adapted to be deflected, torque-producing means responsive to a function of the current strength, torque producing means responsive to a like function of the current strength and also substantially proportional to the frequency, means responsive to the deflection for dissimilarly modulating said torques, and means for causing said torques to operate in opposition upon said movable member in such manner that the deflection is substantially a function of the frequency alone for all values of the current.

14. Apparatus for responding to the frequency of a circuit without materially responding to the magnitude of the current-flow, comprising means providing a relatively stationary magnetic path including two spaced terminal magnetizable pole pieces extending side-by-side with an air-gap therebetween, a magnetizing coil for said path, a movable member including a closed-circuited coil and a magnetizing coil inclosing one of said magnetizable pole pieces, at least one of said movable coils having conductors located in said air gap, and connecting means adapted to energize said magnetizing coils from said circuit in such manner that the torque therebetween opposes the torque between the stationary coil and the closed-circuited coil, the proportions being such that the effects of variations in current-strength are substantially eliminated.

15. The method of producing a deflection of an instrument responsive to the frequency of a circuit without being materially responsive to the current-flow, which consists in producing a torque which is substantially proportional, at all times, to the square of the current, producing an opposing torque which is substantially proportional to the square of the current multiplied by the product of the frequency and a function of the deflection, and causing said torques to operate upon the movable member of said instrument in such manner that the components proportional to the square of the current substantially neutralize one another.

16. The method of producing a deflection of an instrument responsive to the frequency of a circuit without being materially responsive to the current-flow, which consists in producing a torque having a component which is substantially proportional to a function of the current strength, producing a torque having a component which is substantially proportional to a like function of the current strength, and also substantially directly proportional to the frequency, causing said torques to be dissimilarly modulated in accordance with a function of the deflection, and causing said torques to operate in opposition upon the movable member of said instrument in such manner that the deflection is substantially a function of the frequency alone for all values of the current.

17. The method of obtaining a deflection responsive to a frequency of a current independent of the value of the same, which consists in opposing two forces which are similarly affected by the changes in the current, one of said forces being proportional to the product of a variable quantity and a function of the current alone, and the other of said forces being proportional to the product of the same variable quantity, the same function of the current, a function of the frequency and a function of the deflection.

In testimony whereof, I have hereunto subscribed my name this 29th day of Oct., 1918.

PAUL MacGAHAN.